United States Patent
Chen et al.

(10) Patent No.: US 12,261,484 B2
(45) Date of Patent: Mar. 25, 2025

(54) MOTOR, COMPRESSOR AND REFRIGERATION DEVICE

(71) Applicant: ANHUI MEIZHI PRECISION MANUFACTURING CO., LTD., Anhui (CN)

(72) Inventors: Chao Chen, Anhui (CN); Dejin Zhang, Anhui (CN); Xiaohua Qiu, Anhui (CN)

(73) Assignee: ANHUI MEIZHI PRECISION MANUFACTURING CO., LTD., Anhui (CN)

( * ) Notice: Subject to any disclaimer, the term of this patent is extended or adjusted under 35 U.S.C. 154(b) by 315 days.

(21) Appl. No.: 17/554,148

(22) Filed: Dec. 17, 2021

(65) Prior Publication Data

US 2022/0109338 A1    Apr. 7, 2022

Related U.S. Application Data

(63) Continuation of application No. PCT/CN2020/099643, filed on Jul. 1, 2020.

(30) Foreign Application Priority Data

May 26, 2020   (CN) .......................... 202010457449.6

(51) Int. Cl.
*H02K 1/27*    (2022.01)
*H02K 1/02*    (2006.01)
(Continued)

(52) U.S. Cl.
CPC ............. *H02K 1/2726* (2013.01); *H02K 1/02* (2013.01); *H02K 1/16* (2013.01); *H02K 15/03* (2013.01); *H02K 2213/03* (2013.01)

(58) Field of Classification Search
CPC .......... H02K 1/2726; H02K 1/02; H02K 1/16; H02K 15/03; H02K 2213/03; H02K 29/03;
(Continued)

(56) References Cited

U.S. PATENT DOCUMENTS

| | | |
|---|---|---|
| 2009/0189471 A1 | 7/2009 | Amano et al. |
| 2011/0068651 A1 | 3/2011 | Miyata et al. |

(Continued)

FOREIGN PATENT DOCUMENTS

| | | |
|---|---|---|
| CN | 102201711 A | 9/2011 |
| CN | 203574521 U | 4/2014 |

(Continued)

OTHER PUBLICATIONS

Request for the Submission of an Opinion dated Aug. 21, 2023 received in Korean Patent Application No. KR 10-2021-7039014.
(Continued)

*Primary Examiner* — Thomas Truong
(74) *Attorney, Agent, or Firm* — Scully, Scott, Murphy & Presser, P.C.

(57) ABSTRACT

A motor, a compressor, and a refrigeration device are provided. The motor includes a stator assembly and a rotor assembly. The stator assembly includes a stator core provided with a stator slot. The rotor assembly includes a rotor core and a permanent magnet. The stator core is sleeved outside of the rotor core or vice versa. The permanent magnet is arranged on the rotor core. By limiting the relationship between the distance between the stator core and the rotor core, the length of the permanent magnet in its own magnetization direction, the number of the stator slots, and the intrinsic coercivity of the permanent magnet, it is possible to adjust the strength of the demagnetization reverse magnetic field generated by energizing the motor.

9 Claims, 4 Drawing Sheets

A

(51) Int. Cl.
*H02K 1/16* (2006.01)
*H02K 1/2726* (2022.01)
*H02K 15/03* (2006.01)

(58) Field of Classification Search
CPC .. H02K 2201/03; H02K 1/2766; H02K 21/16; H02K 1/165; F25B 31/02; F04B 35/04; F04B 39/121
See application file for complete search history.

(56) References Cited

U.S. PATENT DOCUMENTS

| | | | | |
|---|---|---|---|---|
| 2016/0254713 A1* | 9/2016 | Yamaguchi | ............ | H02K 21/14 310/156.38 |
| 2016/0336839 A1 | 11/2016 | Marino et al. | | |
| 2018/0183285 A1* | 6/2018 | Asano | .................... | H02K 21/14 |
| 2019/0181734 A1 | 6/2019 | Rong et al. | | |
| 2019/0319509 A1* | 10/2019 | Ishikawa | ................ | H02K 21/14 |
| 2020/0332166 A1* | 10/2020 | Kumakura | ............... | F24F 11/65 |
| 2021/0175786 A1 | 6/2021 | Hu et al. | | |

FOREIGN PATENT DOCUMENTS

| | | | |
|---|---|---|---|
| CN | 104380584 A | | 2/2015 |
| CN | 104410234 A | | 3/2015 |
| CN | 104901456 A | * | 9/2015 |
| CN | 105375657 A | | 3/2016 |
| CN | 106787281 A | | 5/2017 |
| CN | 109301958 A | | 2/2019 |
| CN | 109831084 A | | 5/2019 |
| CN | 210167867 U | | 3/2020 |
| EP | 2348613 A1 | | 7/2011 |
| EP | 2693602 A1 | | 2/2014 |
| EP | 3018802 A2 | | 5/2016 |
| JP | 2000-102199 A | | 4/2000 |
| JP | 2009-153356 A | | 7/2009 |
| JP | 2012055117 A | | 3/2012 |
| JP | 2018170940 A | | 11/2018 |
| JP | 2019-068577 A | | 4/2019 |
| JP | 2019146484 A | | 8/2019 |
| WO | 2013114542 A1 | | 8/2013 |
| WO | 2017077580 A1 | | 5/2017 |
| WO | 2017190090 A1 | | 11/2017 |
| WO | 2020/003414 A1 | | 1/2020 |
| WO | 2020003341 A1 | | 1/2020 |
| WO | 2020089991 A1 | | 5/2020 |

OTHER PUBLICATIONS

Notice of Reasons for Refusal dated Dec. 20, 2022 received in Japanese Patent Application No. JP 2021-572046.
Decision of Refusal dated Mar. 22, 2023 received in Japanese Patent Application No. JP 2021-572046.
International Search Report dated Mar. 2, 2021 received in International Application No. PCT/CN2020/099643 together with an English language translation.
First Office Action dated Jan. 6, 2021 received in Chinese Patent Application No. CN 202010457449.6 together with an English language translation.
Supplementary European Search Report dated Aug. 30, 2022 received in European Patent Application No. EP 20937171.5.
Notice of Final Rejection dated Feb. 7, 2024 received in Korean Patent Application No. KR 10-2021-7039014.
Office Action dated Dec. 13, 2023 received in European Patent Application No. EP 20937171.5.

* cited by examiner

MOTOR, COMPRESSOR AND REFRIGERATION DEVICE

CROSS-REFERENCE TO RELATED APPLICATIONS

The present application is a continuation application of PCT International Application No. PCT/CN2020/099643, filed on Jul. 1, 2020, which claims priority to and benefits of Chinese Patent Application No. 202010457449.6 filed with China National Intellectual Property Administration on May 26, 2020 and entitled "Motor, Compressor And Refrigeration Device", the entire contents of which are herein incorporated by reference for all purposes. No new matter has been introduced.

FIELD

The present application relates to the technical field of refrigeration devices, and particularly relates to a motor, a compressor and a refrigeration device.

BACKGROUND

At present, in the field of household air conditioners, variable-frequency motors have become the mainstream technology, especially in the situation where with the promulgation of the new Chinese National Standards of Energy Efficiency Grades for household air conditioners in 2019, fixed-speed motors have been gradually withdrawn from the market, and the era of variable-frequency motors has arrived. In order to meet the requirement for use in the compressors of air conditioning systems, the permanent magnets used in the existing variable-frequency motors are mostly neodymium iron boron permanent magnets containing heavy rare earth elements and having relatively high intrinsic coercivity. However, heavy rare earth elements are national strategic resources, and with the development trend that the household air conditioners all become variable-frequency air conditioners, the total quantity of variable-frequency motors is increasing every year, and the consumption of national strategic resources of heavy rare earth elements (especially dysprosium and terbium) is also increasing every year. Moreover, the cost of the permanent magnets containing heavy rare earth elements is high, increasing the manufacturing cost of the compressor motors.

In order to reduce the consumption of the strategic resources and lower the cost of the motors, the use of heavy rare earth elements in the permanent magnets can be reduced. However, studies have shown that a reduction in the content of heavy rare earth elements in the permanent magnets will make the motors less resistant to demagnetization than required for use.

SUMMARY

The present application aims to at least solve one of the technical problems existing in the prior art or the related art.

To this end, an embodiment of a first aspect of the present application proposes a motor.

An embodiment of a second aspect of the present application proposes a compressor.

An embodiment of a third aspect of the present application proposes a refrigeration device.

In view of this, an embodiment according to the first aspect of the present application proposes a motor, comprising: a stator assembly, comprising a stator core provided with a stator slot; and a rotor assembly, comprising a rotor core and a permanent magnet, the stator core being provided around the outer circumference of the rotor core or vice versa, and the permanent magnet being arranged on the rotor core, wherein in a section perpendicular to an axis of the rotor core, the distance between the stator core and the rotor core is $\delta$ mm, and the length of the permanent magnet in its own magnetization direction is h mm, the number of the stator slots is Q, the intrinsic coercivity of the permanent magnet is Hcj kA/m, Hcj being less than or equal to 1800 kA/m, and the value of h satisfies: $80 \times (43-Q)/Hcj \leq h \leq 1.6 + \delta$.

The motor provided by the embodiment of the present application comprises a stator assembly and a rotor assembly. The stator assembly comprises a stator core provided with a stator slot. The rotor assembly comprises a rotor core and a permanent magnet, the rotor core being provided with the permanent magnet. In a section perpendicular to an axis of the rotor core, it is defined that the distance between the stator core and the rotor core is $\delta$ mm, the length of the permanent magnet in its own magnetization direction is h mm, the number of the stator slots is Q, and the intrinsic coercivity of the permanent magnet is Hcj kA/m. By limiting the relationship between the distance between the stator core and the rotor core, the length of the permanent magnet in its own magnetization direction, the number of the stator slots, and the intrinsic coercivity of the permanent magnet, it is possible to adjust the strength of the demagnetization reverse magnetic field generated by energizing the motor. In other words, the strength of the reverse magnetic field, which is generated by energizing the winding of the motor to demagnetize the permanent magnet, can be adjusted. Thus, when the mass percentage of heavy rare earth elements in the permanent magnet is reduced or the permanent magnet is free of heavy rare earth elements (i.e., when the anti-demagnetization ability of the motor cannot meet the requirement for compressor use), the strength of the demagnetization reverse magnetic field generated by energizing the motor is reduced, and the utilization rate of the permanent magnet is improved.

For example, when the intrinsic coercivity Hcj of the permanent magnet is less than or equal to 1800, it is indicated that the mass percentage of heavy rare earth elements in the permanent magnet is relatively low, the manufacturing cost of the motor is relatively low, and the anti-demagnetization ability of the motor is decreased. Therefore, for the motor provided by the present application, by arranging stator slots by the number of Q in the stator core, setting the distance between the stator core and the rotor core to $\delta$ mm, and making the numerical range of the length h mm of the permanent magnet in the its own magnetization direction satisfy $80 \times (43-Q)/Hcj \leq h \leq 1.6 + \delta$, the strength of the demagnetization reverse magnetic field generated by energizing the motor is reduced, and thus the anti-demagnetization ability of the motor is enhanced, so that the anti-demagnetization ability of the motor can meet the requirement of demagnetization resistance for the operation of the compressor. At the same time, the reduction in the use of high-cost heavy rare earth raw materials and the increase in the utilization rate of the permanent magnet of the motor also reduce the production cost of the motor. That is, the motor of the present application can meet the requirement for compressor use, with reduced use of heavy rare earth elements and decreased cost, leading to improved cost performance.

In addition, the motor in the above embodiment provided according to the present application may also have the following additional technical features.

In any of the above embodiments, further, the value of h satisfies: $80 \times (45-Q)/H_{cj} \leq h \leq 1.3+\delta$.

In this embodiment, it is further limited that the numerical range of the length h mm of the permanent magnet in its own magnetization direction is: $80 \times (45-Q)/H_{cj} \leq h \leq 1.3+\delta$. By reasonably setting the relationship between h and Q, $H_{cj}$, $\delta$, it is beneficial to further reducing the strength of the demagnetization reverse magnetic field generated by energizing the motor on the basis of improving the utilization rate of the permanent magnet of the motor, and improving the anti-demagnetization ability of the motor, so that while the manufacturing cost of the motor is reduced by improving the utilization rate of the permanent magnet of the motor and reducing the mass percentage of heavy rare earth elements in the permanent magnet, the anti-demagnetization ability of the motor can still meet the requirement of demagnetization resistance for the operation of the compressor, improving the cost performance of the motor.

In any of the above embodiments, further, the number Q of the stator slots ranges from 12 to 36; and/or the distance $\delta$ between the stator core and the rotor core ranges from 0.3 to 0.5 mm; and/or the remanence Br of the permanent magnet ranges from 1.28 T to 1.45 T.

In this embodiment, the numerical ranges of the number Q of the stator slots, the distance $\delta$ between the stator core and the rotor core, and the remanence Br of the permanent magnet are limited respectively. For example, in one aspect, the number of the stator slots is $12 \leq Q \leq 36$. By reasonably setting the number of the stator slots, it is conducive to reducing the number of turns of the winding in each stator slot, thereby reducing the strength of the demagnetization reverse magnetic field generated by energizing the motor and increasing the anti-demagnetization ability of the motor.

In another aspect, the distance between the stator core and the rotor core is 0.3 mm$\leq \delta \leq$0.5 mm. By reasonably setting the distance between the stator core and the rotor core, it is conducive to reducing the usage of the permanent magnet in the motor while ensuring the relatively high utilization rate of the permanent magnet, thereby reducing the manufacturing cost of the motor and improving the cost performance of the motor, while ensuring the relatively high anti-demagnetization ability of the motor.

In a further aspect, the remanence of the permanent magnet is 1.28 T$\leq$Br$\leq$1.45 T. Remanence refers to a surface field retained by the permanent magnet after magnetization to technical saturation and removal of the external magnetic field, and Br is the residual magnetic induction strength. By reasonably setting the remanence, under the same magnetic load, the larger the value of the remanence Br is, the smaller the usage of the permanent magnet is, thus reducing the manufacturing cost of the motor. Moreover, by reasonably setting the remanence, it is conducive to reducing iron loss, thus improving the efficiency of the motor.

In any of the above embodiments, further, the mass percentage of dysprosium and/or terbium in the permanent magnet ranges from 0 to 0.5%, or the mass percentage of heavy rare earth elements in the permanent magnet ranges from 0 to 0.5%.

In this embodiment, dysprosium and terbium are heavy rare earth elements, which are national strategic resources, and the mass percentage of heavy rare earth elements in the permanent magnet is positively correlated with the magnitude of the intrinsic coercivity $H_{cj}$ of the permanent magnet. Therefore, on the one hand, by limiting the range of the mass percentage of dysprosium and/or terbium in the permanent magnet to 0 to 0.5%, it is beneficial to reducing the use of dysprosium and/or terbium while ensuring a good anti-demagnetization ability of the motor, which is therefore beneficial to reducing the manufacturing cost of the motor and improving the cost performance of the motor. On the other hand, by limiting the range of the mass percentage of heavy rare earth elements in the permanent magnet to 0 to 0.5%, it is beneficial to reducing the use of heavy rare earth elements while ensuring a good anti-demagnetization ability of the motor, which is therefore beneficial to reducing the manufacturing cost of the motor and improving the cost performance of the motor.

In any of the above embodiments, further, the motor further comprises: punching sheets, the stator core being formed by stacking the punching sheets, and/or the rotor core being formed by stacking the punching sheets.

In this embodiment, the motor further comprises punching sheets. In one aspect, the stator core is formed by stacking the punching sheets; in another aspect, the rotor core is formed by stacking the punching sheets; and in a further aspect, the stator core and the rotor core are both formed by stacking the punching sheets. The different formation manner of the stator core or the rotor core can meet the requirement of different processing processes of the stator assembly and the rotor assembly, leading to a wide scope of application.

For example, the stator core and the rotor core are both formed by stacking the punching sheets. In one aspect, the punching sheets stacked into the stator core are the same as the punching sheets stacked into the rotor core, which is conducive to the mass production of the punching sheets and the reduction in the manufacturing cost. In another aspect, the punching sheets stacked into the stator core are different from the punching sheets stacked into the rotor core, which is conducive to selection of proper punching sheets according to the performance requirement of the motor so as to form the rotor core and the stator core, thus ensuring good performance of the motor. Further, the form of stacking the punching sheets realizes the effect of magnetic conductivity of the iron core, can fix the winding, and can effectively dissipate heat from the motor, so that the motor runs more stably.

In any of the above embodiments, further, the punching sheet is made of a soft magnetic material; and/or the thickness of the punching sheet is 0.2 mm to 0.35 mm.

In this embodiment, in one aspect, the soft magnetic material can achieve a relatively large magnetization strength with a relatively small external magnetic field, and to select the soft magnetic material as the raw material for the punching sheet enables the punching sheet to have a high magnetic conductivity, and to be magnetized easily and demagnetized easily, which is conducive to reducing the loss of the stator core and/or the rotor core, i.e., reducing the iron loss of the motor, and therefore is conducive to improving the performance of the motor.

In one aspect, the thickness of the punching sheet is specified to be within 0.2 mm to 0.35 mm. The reasonable setting of the thickness of the punching sheet is conducive to effectively reducing iron loss and improving magnetic conductivity, while ensuring good mechanical strength of the stator core and/or the rotor core, and the reasonable range setting can also meet the working requirements of the motors of different power.

In any of the above embodiments, further, the rotor core is provided with a mounting groove, and the permanent magnet is arranged in the mounting groove, and the mounting groove is a V-shaped groove, a U-shaped groove, a W-shaped groove, a flat groove or an I-shaped groove.

In this embodiment, the mounting groove is arranged to have a variety of different structures, such as a V-shaped groove, a U-shaped groove, a W-shaped groove, a flat groove or an I-shaped groove, which can correspondingly realize the mounting of the permanent magnets of different structures therein, making the manufacturing process of the motor more flexible, with more options, and can meet a variety of different application scenarios and expand the scope of use of the product.

An embodiment according to the second aspect of the present application provides a compressor, comprising: a casing, and the motor in any one of the above embodiments, the motor being arranged within the casing.

The compressor provided by the present application comprises the motor in any of the above embodiments, and therefore has all the beneficial effects of the motor.

An embodiment according to the third aspect of the present application provides a refrigeration device, comprising: the motor in any of the above embodiments, or the compressor in any of the above embodiments.

The refrigeration device provided by the present application comprises the motor in any of the above embodiments or the compressor in any of the above embodiments, and therefore has all the beneficial effects of the motor or the compressor, which will not be repeated here.

Additional aspects and advantages of the present application will become apparent in the following description, or are understood by the practice of the present application.

BRIEF DESCRIPTION OF THE DRAWINGS

The above and/or additional aspects and advantages of the present application will become apparent and readily understood from the following description of embodiments in conjunction with the drawings, in which.

Figure 1:
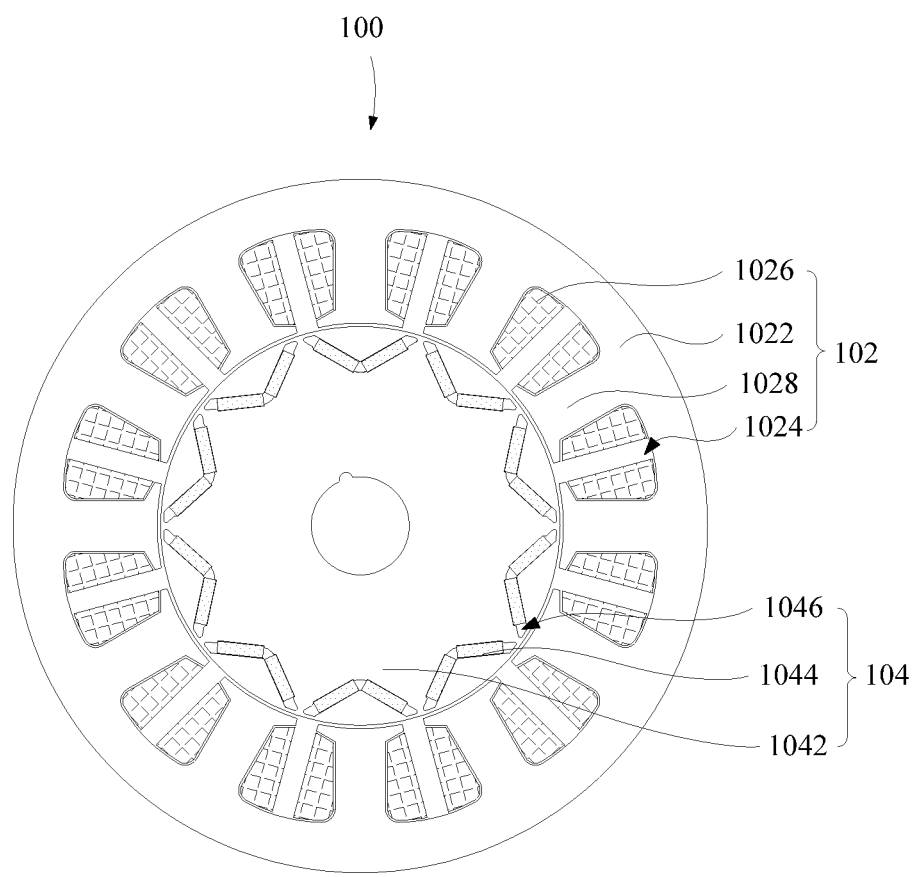
FIG. 1 is a schematic structural diagram of a motor according to an exemplary embodiment of the present application.
Figure 2:
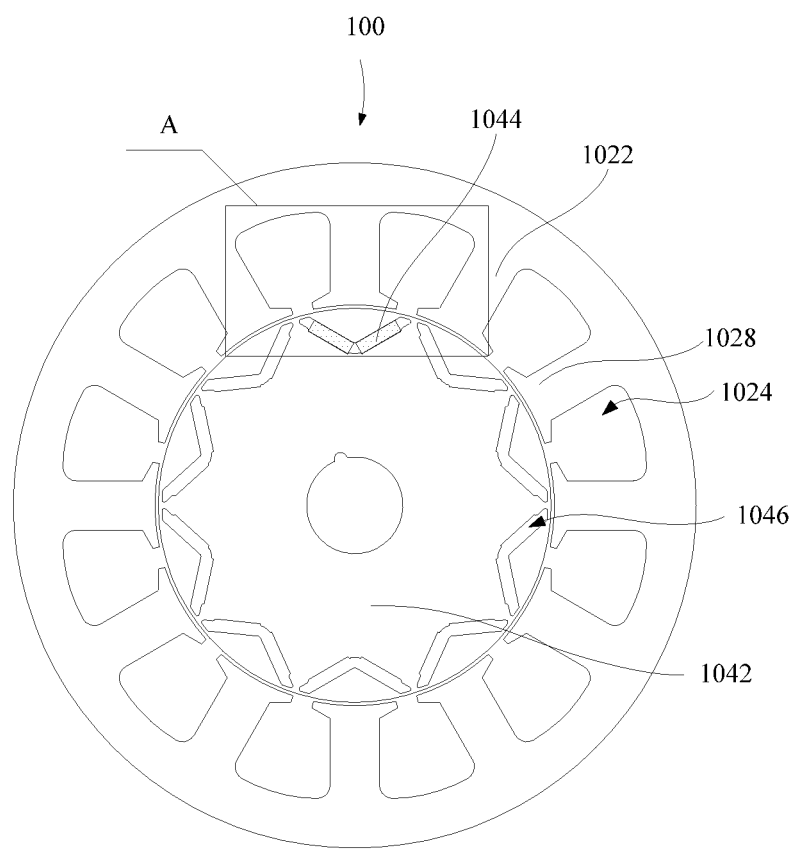
FIG. 2 is a schematic structural diagram of a motor according to an alternative exemplary embodiment of the present application.
Figure 3:
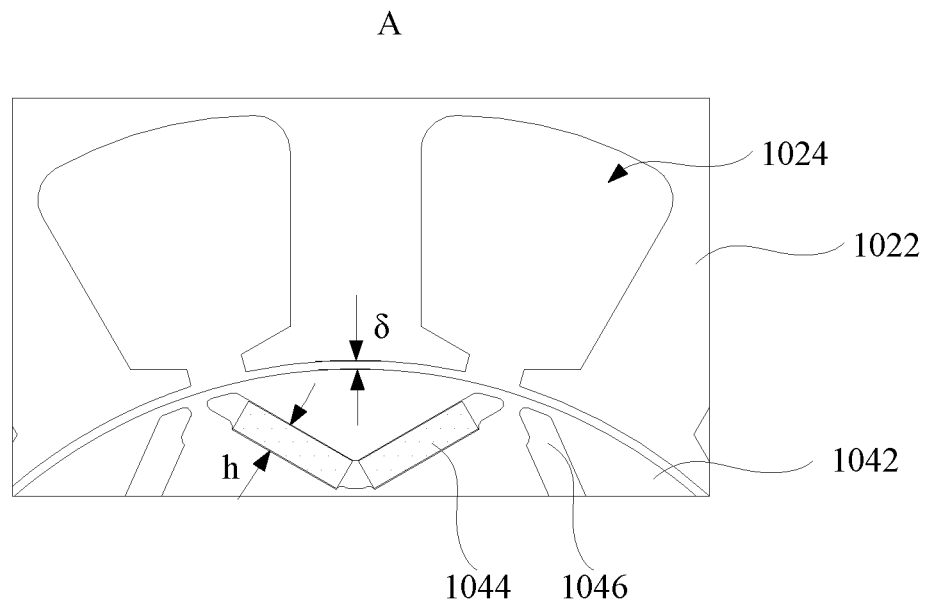
FIG. 3 is a partially enlarged schematic diagram at A of the embodiment shown in FIG. 2.

The description of the reference numerals shown in FIG. 1 to FIG. 3 is provided as follows:

100 motor, 102 stator assembly, 1022 stator core, 1024 stator slot, 1026 winding, 1028 stator protruding tooth, 104 rotor assembly, 1042 rotor core, 1044 permanent magnet, and 1046 mounting groove.

DETAILED DESCRIPTION OF THE DISCLOSURE

In order that the above-mentioned objectives, features and advantages of the present application can be understood more clearly, a further detailed description of the present application will be given below in connection with the accompanying drawings and specific embodiments. It should be noted that the embodiments of the present application and the features in the embodiments can be combined with each other if there is no conflict.

In the following description, numerous specific details are set forth in order to provide a thorough understanding of the present application. However, the present application can also be implemented in other manners than those described herein. Therefore, the protection scope of the present application is not limited to the specific embodiments disclosed below.

A motor 100, a compressor and a refrigeration device according to some embodiments of the present application are described below with reference to FIGS. 1-5.

As shown in FIGS. 1-3, an embodiment according to the first aspect of the present application provides a motor 100, comprising: a stator assembly 102 and a rotor assembly 104.

For example, as shown in FIG. 1, the stator assembly 102 comprises a stator core 1022 provided with a stator slot 1024. The rotor assembly 104 comprises a rotor core 1042 and a permanent magnet 1044. The rotor core 1042 is provided with the permanent magnet 1044. As shown in FIG. 3, in a section perpendicular to an axis of the rotor core 1042, the distance between the stator core 1022 and the rotor core 1042 is δ mm, the length of the permanent magnet 1044 in its own magnetization direction is h mm, the number of the stator slots 1024 is Q, and the intrinsic coercivity of the permanent magnet 1044 is Hcj kA/m, Hcj being less than or equal to 1800 kA/m. By further limiting the relationship between the distance between the stator core 1022 and the rotor core 1042, the length of the permanent magnet 1044 in its own magnetization direction, the number of the stator slots 1024, and the intrinsic coercivity of the permanent magnet, it is possible to adjust the strength of the demagnetization reverse magnetic field generated by energizing the motor 100. In other words, the strength of the reverse magnetic field, which is generated by energizing the winding 1026 of the motor 100 to demagnetize the permanent magnet 1044, can be adjusted, so that when the mass percentage of heavy rare earth elements in the permanent magnet is reduced or the permanent magnet 1044 is free of heavy rare earth elements (i.e., when the anti-demagnetization ability of the motor 100 cannot meet the requirement for compressor use), the strength of the demagnetization reverse magnetic field generated by energizing the motor 100 is reduced, and the utilization rate of the permanent magnet 1044 is improved.

For example, when the intrinsic coercivity Hcj of the permanent magnet 1044 is less than or equal to 1800, which is lower than the intrinsic coercivity of the permanent magnet containing heavy rare earth elements under the same circumstances, it is indicated that the mass percentage of heavy rare earth elements in the permanent magnet 1044 is relatively low, the manufacturing cost of the motor 100 is relatively low, and the anti-demagnetization ability of the motor 100 is decreased. Therefore, for the motor 100 provided by the present application, by arranging the stator slots 1024 by the number Q in the stator core 1022, setting the distance between the stator core 1022 and the rotor core 1042 to δ mm, and making the numerical range of the length h mm of the permanent magnet 1044 in the its own magnetization direction satisfy $80 \times (43-Q)/Hcj \leq h \leq 1.6+\delta$, the strength of the demagnetization reverse magnetic field generated by energizing the motor 100 is reduced, and thus the anti-demagnetization ability of the motor 100 is enhanced, so that the anti-demagnetization ability of the motor 100 can meet the requirement of demagnetization resistance for the operation of the compressor. At the same time, the reduction in the use of high-cost heavy rare earth raw materials and the increase in the utilization rate of the permanent magnet 1044 of the motor 100 also reduce the production cost of the motor 100. That is, the motor 100 of the present application can meet the requirement for compressor use, with reduced use of heavy rare earth elements and decreased cost, leading to enhanced cost performance.

For example, the intrinsic coercivity of the permanent magnet 1044 referred to in the present application is the intrinsic coercivity of the permanent magnet 1044 at 20° C. The strength of the applied reverse magnetic field that causes the vector sum of the microscopic magnetic dipole moments inside the permanent magnet 1044 to decrease to zero is called the intrinsic coercivity of the magnet. The length of the permanent magnet 1044 in its own magnetization direction is the thickness of the permanent magnet 1044, and the length of the permanent magnet 1044 in the axial direction of the rotor core is the length of the permanent magnet.

Figure 4:
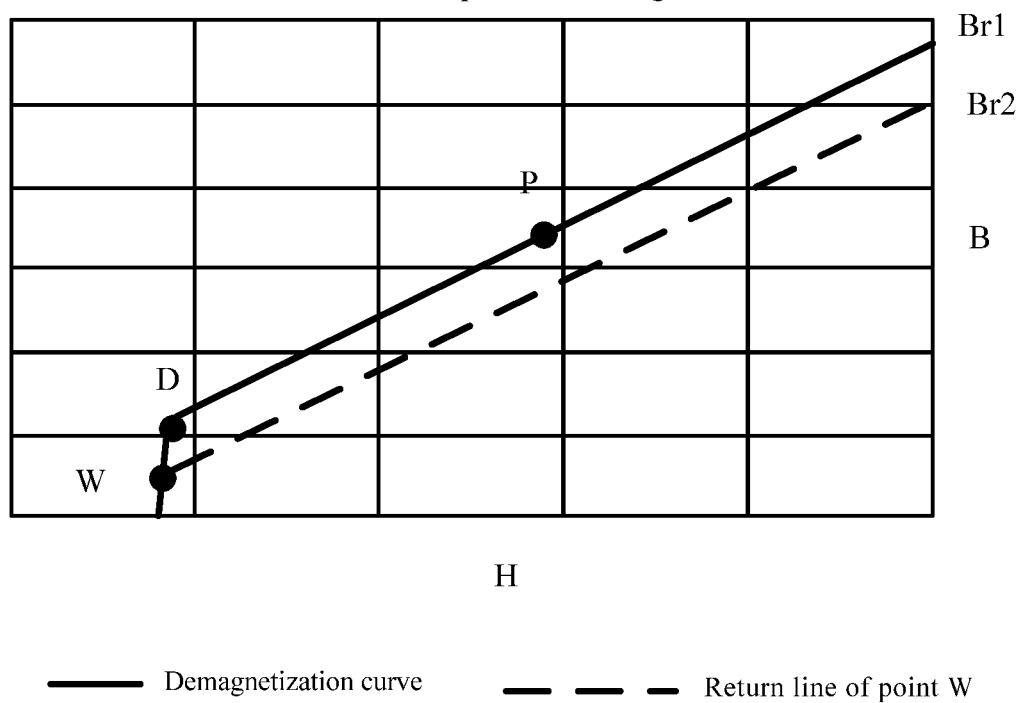
FIG. 4 is a B-H curve diagram of a permanent magnet according to an embodiment of the present application.

For example, the B-H curve of the permanent magnet (or the rare earth permanent magnet material) is shown in FIG. 4. When the permanent magnet 1044 does not have an externally applied magnetic field, the working point of the permanent magnet 1044 is at the position of point P. When a reverse magnetic field is applied, the working point moves down along the B-H curve to the position of point W, and when the reverse magnetic field is removed, the working point returns along the return line of point W. When point W is located above the inflection point D of the B-H curve, i.e., when point W is located at any position shown by the Br1-D solid line in FIG. 4, the return line coincides with the Br1-D solid line in the B-H curve, and the remanence is Br1. When point W is located below the inflection point D, i.e., when point W is located at any position shown by the D-W solid line in FIG. 4, the return line of point W is parallel to the Br1-D solid line (i.e., the straight line segment of the B-H curve), as shown by the Br2-W dotted line in FIG. 4, and at this time, the remanence is Br2, producing irreversible demagnetization, i.e., the demagnetization loss is the difference between Br1 and Br2.

As can be seen, there are three factors that affect the anti-demagnetization ability of the motor 100, i.e., the magnitude of the absolute value of the intrinsic coercivity Hcj of the permanent magnet 1044, the position of the working point of the permanent magnet, and the strength of the reverse magnetic field. The strength of the reverse magnetic field is the strength of the reverse magnetic field generated by energizing the winding of the motor 100 to demagnetize the permanent magnet. Hcj of the permanent magnet 1044 determines the magnitude of the value of the inflection point D. The larger the absolute value of Hcj is, the larger the H value (i.e., Hd) of the inflection point D is and the stronger the anti-demagnetization ability is. The smaller the absolute value of Hcj is, the smaller the Hd value of the inflection point D is and the weaker the anti-demagnetization ability is. The higher the position of the working point of the permanent magnet 1044 is, the stronger the anti-demagnetization ability is. The strength of the reverse magnetic field determines the distance by which the working point P moves down to W. When the working point position P remains unchanged, the reverse magnetic field is relatively strong, and the lower point W is, the weaker the anti-demagnetization ability is.

Figure 5:
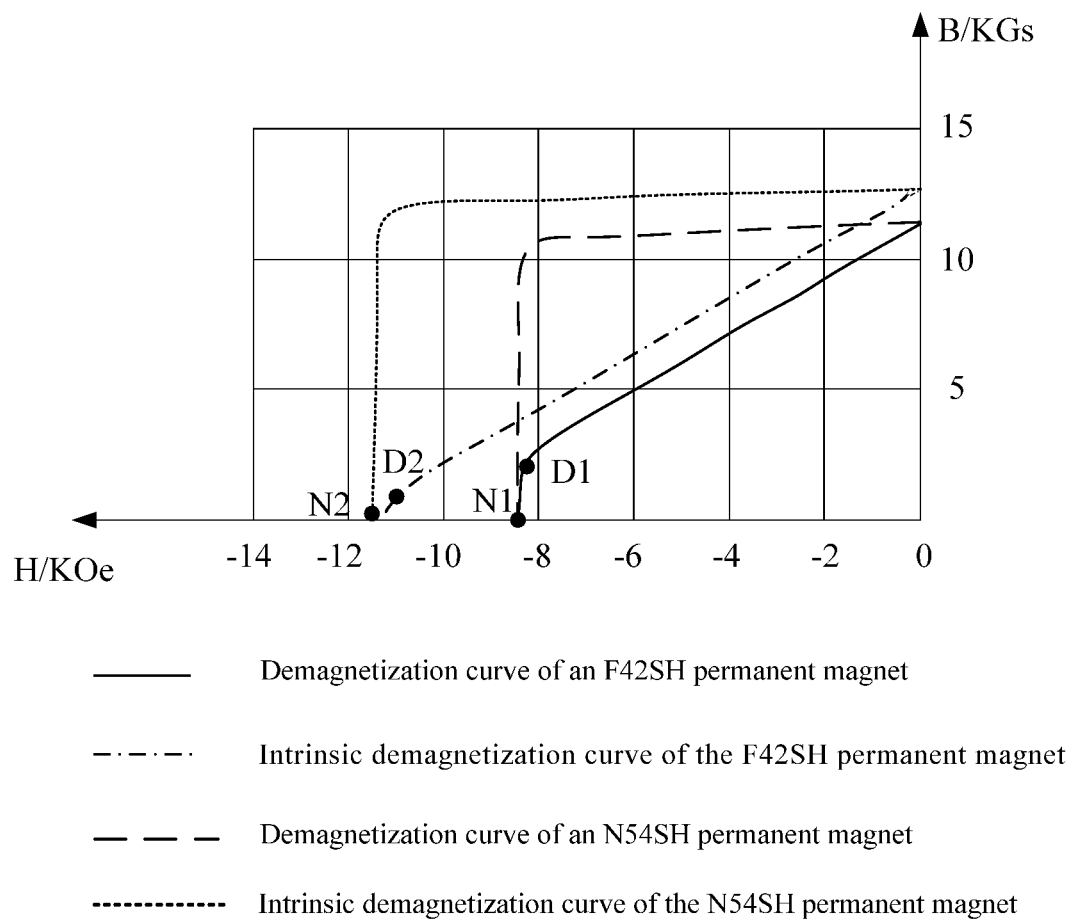
FIG. 5 is a B-H curve diagram of different permanent magnets according to an embodiment of the present application.

The magnitude of the intrinsic coercivity Hcj of the permanent magnet 1044 is positively correlated with the mass percentage of heavy rare earth elements in the permanent magnet 1044. In other words, the larger the mass percentage of heavy rare earth elements in the permanent magnet 1044 is, the larger the intrinsic coercivity Hcj of the permanent magnet 1044 is, and the smaller the mass percentage of heavy rare earth elements in the permanent magnet 1044 is, the smaller the intrinsic coercivity Hcj of the permanent magnet 1044 is. However, since heavy rare earth elements are national strategic resources with high cost, enhancing the anti-demagnetization ability of the motor 100 by increasing the mass percentage of heavy rare earth elements in the permanent magnet 1044 has the problems of consuming national strategic resources and increasing the manufacturing cost of the motor 100. If the manufacturing cost of the motor 100 is reduced by reducing the mass percentage of heavy rare earth elements in the permanent magnet 1044 or making the permanent magnet 1044 free of heavy metal elements, such as dysprosium and terbium, the intrinsic coercivity of the permanent magnet 1044 will be affected. Taking the permanent magnet 1044 free of dysprosium and terbium as an example, the intrinsic coercivity (Hcj≤1800 kA/m) of the permanent magnet free of dysprosium and terbium is significantly smaller than the coercivity (Hcj≥1830 kA/m) of the permanent magnet containing dysprosium and terbium. The B-H curves of permanent magnets free of dysprosium and terbium and permanent magnets containing dysprosium and terbium are shown in FIG. 5. In the field of compressors, if the permanent magnets free of dysprosium and terbium are directly applied to some motors (such as 9-slot 6-pole motors), the demagnetization ability of the motors decreases by 40% or more, and the demagnetization ability of the motors cannot meet the requirement for compressor use.

For example, the B-H curves of permanent magnets free of dysprosium and terbium and permanent magnets containing dysprosium and terbium are shown in FIG. 5. The solid line in FIG. 5 represents the demagnetization curve of an F42SH permanent magnet, wherein F42SH is a permanent magnet free of heavy rare earth, such as a neodymium iron boron permanent magnet free of dysprosium and terbium. The dotted lines in FIG. 5 represent the intrinsic demagnetization curve of the F42SH permanent magnet. The dashed lines with longer segments in FIG. 5 represent the demagnetization curve of an N54SH permanent magnet, wherein N54SH is a permanent magnet containing dysprosium and terbium. The dashed lines with shorter segments in FIG. 5 represent the intrinsic demagnetization curve of the N54SH permanent magnet. In FIG. 5, the horizontal coordinate represents the magnetic field strength H in the permanent magnet, with the unit being KOe, i.e., kilo-oersted, and the vertical coordinate represents the magnetic induction strength B induced by the permanent magnet, with the unit being KGs, i.e., kilogauss. D1 in FIG. 5 represents the inflection point of the demagnetization curve of the F42SH permanent magnet, the magnetic field strength H(D1) corresponding to D1 is −8.177 KOe, and N1 is the intersection point of the intrinsic demagnetization curve of the F42SH permanent magnet and the horizontal coordinate, wherein the magnetic field strength H(N1) corresponding to N1 is −8.442 KOe. D2 in FIG. 5 represents the inflection point of the demagnetization curve of the N54SH permanent magnet, the magnetic field strength H(D2) corresponding to D2 is −11.085 KOe, and N2 is the intersection of the intrinsic demagnetization curve of the N54SH permanent magnet and the horizontal coordinate, wherein the magnetic field strength H(N2) corresponding to N2 is −11.454 KOe.

Since the main reason for the higher cost of a variable-frequency motor than a fixed-speed motor lies in the use of the permanent magnet 1044, improving the utilization rate of the permanent magnet 1044 can reduce the usage of the permanent magnet 1044 and save the cost of the motor 100. The utilization rate of the permanent magnet 1044 can reach its highest point when the working point of the permanent magnet 1044 is at a position with the maximum magnetic energy product of the permanent magnet 1044. In other words, the closer the working point of the permanent magnet 1044 is to the position with the maximum magnetic energy product, the higher the utilization rate of the permanent magnet 1044 is. The position with the maximum magnetic energy product of the permanent magnet 1044 is generally the midpoint of the straight section of the demagnetization curve of the permanent magnet 1044. Studies show that, on the one hand, in a section perpendicular to the rotation shaft of the permanent magnet 1044, the larger the length h of the permanent magnet 1044 in its own magnetization direction is, the higher the working point of the permanent magnet 1044 is, and in the upper half of the B-H curve, the higher the working point is and the further the working point is from the point with the maximum magnetic energy product, the lower the utilization rate of the permanent magnet 1044 is. On the other hand, in the section perpendicular to the rotation shaft of the permanent magnet 1044, the distance δ between the stator core 1022 and the rotor core 1042 of the motor 100 (i.e., the air gap between the stator assembly 102 and the rotor assembly 104 of the motor 100) also affects the usage of the permanent magnet 1044. The smaller the air gap width δ is, the lower the usage of the permanent magnet 1044 is. When the width of the permanent magnet 1044 is preset, the length h of the permanent magnet 1044 in its own magnetization direction is smaller.

In other words, in the section perpendicular to the rotation shaft of the permanent magnet 1044, when the length h of the permanent magnet 1044 in its own magnetization direction is large, the working point of the permanent magnet 1044 is high, but the utilization rate of the permanent magnet 1044 is low; and when h is small, the utilization rate of the permanent magnet 1044 is high, but the working point of the permanent magnet 1044 is low, and the anti-demagnetization ability is poor.

Therefore, the present application enhances the anti-demagnetization ability of the motor 100 by reducing the strength of the demagnetization reverse magnetic field generated by energizing the motor 100. Reducing the strength of the demagnetization reverse magnetic field generated by energizing the motor 100 is mainly to reduce the number of the turns of the winding 1026 in each stator slot 1024, and the number of series turns of the winding per phase is equal to the number of turns per slot/2 (double-layer winding) multiplied by the number Q of the stator slots and then divided by the number m of phases. Thus, it can be known that increasing the number Q of the stator slots can reduce the number of the turns per slot of the winding, and when the number of the turns per slot is reduced, the strength of the reverse magnetic field is reduced, and the anti-demagnetization ability of the motor is enhanced. That is, the number of the turns per slot of the winding 1026 is related to the number of the stator slots 1024, and the processing cost of the motor is also related to the utilization rate of the permanent magnet 1044, and the utilization rate of the permanent magnet 1044 is related to the length of the permanent magnet in its own magnetization direction and the distance between the stator core and the rotor core. Therefore, the present application reduces the strength of the demagnetization reverse magnetic field generated by energizing the motor 100 by reasonably setting the relationship between the distance between the stator core 1022 and the rotor core 1042, the number of the stator slots 1024, and the length of the permanent magnet 1044 in its own magnetization direction, and ensures the anti-demagnetization ability of the motor 100 and the utilization rate of the permanent magnet 1044 in the case where the intrinsic coercivity of the permanent magnet 1044 is reduced, which is conducive to reducing the manufacturing cost of the motor 100 and improving the cost performance of the motor 100, and is suitable for promotion and application.

Further, in one aspect, the stator core 1022 is provided around the outer circumference of the rotor core 1042, i.e., the stator assembly 102 is located on the outer side of the rotor assembly 104. In another aspect, the rotor core 1042 is provided around the outer circumference of the stator core 1022, i.e., the rotor assembly 104 is located on the outer side of the stator assembly 102. The arrangement of the stator core 1022 and the rotor core 1042 at different positions can meet the requirements of different types of motors 100, so that for different types of motors 100, by limiting the distance between the stator core 1022 and the rotor core 1042, the length of the permanent magnet 1044 in its own magnetization direction, and the number of the stator slots 1024 in a section perpendicular to the axis of the rotor core 1042, the strength of the demagnetization reverse magnetic field generated by energizing the motor 100 can be reduced, thereby enhancing the anti-demagnetization ability of the motor 100, improving the performance of the motor 100, and enabling the motor 100 to meet the requirements for compressor use. [0057] As shown in FIGS. 1-3, according to another embodiment of the present application, the motor 100 comprises a stator assembly 102 and a rotor assembly 104. The stator assembly 102 comprises a stator core 1022 provided with a stator slot 1024, and the rotor assembly 104 comprises a rotor core 1042 and a permanent magnet 1044. Further, the number of the stator slots 1024 is Q, the intrinsic coercivity of the permanent magnet 1044 is Hcj kA/m, Hcj being less than or equal to 1800 kA/m, the distance between the stator core 1022 and the rotor core 1042 is δ mm, and the length of the permanent magnet 1044 in its own magnetization direction is h mm, the value of h satisfying: $80\times(45-Q)/Hcj \leq h \leq 1.3+\delta$.

In this embodiment, as shown in FIG. 3, it is further limited that the numerical range of the length h mm of the permanent magnet 1044 in its own magnetization direction is: $80\times(45-Q)/Hcj \leq h \leq 1.3+\delta$. By reasonably setting the relationship between h and Q, Hcj, δ, it is beneficial to further reducing the strength of the demagnetization reverse magnetic field generated by energizing the motor 100 on the basis of improving the utilization rate of the permanent magnet 1044 of the motor 100, and improving the anti-demagnetization ability of the motor 100, so that while the manufacturing cost of the motor 100 is reduced by improving the utilization rate of the permanent magnet 1044 and reducing the mass percentage of heavy rare earth elements in the permanent magnet 1044, the anti-demagnetization ability of the motor 100 can still meet the requirement of demagnetization resistance for the operation of the compressor, thereby improving the cost performance of the motor 100.

Further, the stator core 1022 is provided with stator slots 1024 and stator protruding teeth 1028, and any stator slot 1024 is arranged between two adjacent stator protruding teeth 1028. The stator assembly 102 further comprises a coil, the coil is located in the stator slot 1024 across the stator protruding teeth 1028 to form the winding 1026, and the number of the turns of the winding 1026 refers to the number of turns of the coil around the stator protruding teeth 1028.

Further, the number Q of the stator slots 1024 ranges from 12 to 36; and/or the distance δ between the stator core 1022 and the rotor core 1042 ranges from 0.3 to 0.5 mm; and/or the remanence Br of the permanent magnet ranges from 1.28 T to 1.45 T.

In this embodiment, the numerical ranges of the number Q of the stator slots 1024, the distance δ between the stator core 1022 and the rotor core 1042, and the remanence Br of the permanent magnet 1044 are limited respectively. For example, in one aspect, the number of the stator slots 1024 is 12≤Q≤36. By reasonably setting the number of the stator slots 1024, it is conducive to reducing the number of the turns of the winding 1026 in each stator slot 1024, thereby reducing the strength of the demagnetization reverse magnetic field generated by energizing the motor 100 and increasing the anti-demagnetization ability of the motor 100. The number of the stator slots 1024 can be 9, 12, 18, 24 or 36.

In another aspect, the distance between the stator core 1022 and the rotor core 1042 is 0.3 mm≤δ≤0.5 mm. By reasonably setting the distance between the stator core 1022 and the rotor core 1042, it is conducive to reducing the usage of the permanent magnet 1044 in the motor 100 while ensuring the relatively high utilization rate of the permanent magnet 1044, thereby reducing the manufacturing cost of the motor and improving the cost performance of the motor, while ensuring the relatively high anti-demagnetization ability of the motor 100. For example, in a section perpendicular to the axis of the rotor core 1042, the distance δ between the stator core 1022 and the rotor core 1042 (i.e., the air gap between the stator assembly and the rotor assembly) is 0.3 mm, 0.4 mm or 0.5 mm.

The remanence of the permanent magnet 1044 is 1.28 T≤Br≤1.45 T. Remanence refers to a surface field retained by the permanent magnet after magnetization to technical saturation and removal of the external magnetic field, and Br is the residual magnetic induction strength. By reasonably setting the remanence, under the same magnetic load, the larger the value of the remanence Br is, the smaller the usage of the permanent magnet is, thus reducing the manufacturing cost of the motor. Moreover, by reasonably setting the remanence, it is conducive to reducing iron loss, thus improving the efficiency of the motor. The remanence of the permanent magnet can be 1.28 T, 1.32 T or 1.45 T, T being the unit Tesla.

As shown in FIGS. 1-3, according to another exemplary embodiment the mass percentage of dysprosium and/or terbium in the permanent magnet ranges from 0 to 0.5%, or the mass percentage of heavy rare earth elements in the permanent magnet ranges from 0 to 0.5%.

In this embodiment, dysprosium and terbium are heavy rare earth elements, which are national strategic resources, and the mass percentage of heavy rare earth elements in the permanent magnet 1044 is positively correlated with the magnitude of the intrinsic coercivity Hcj of the permanent magnet 1044. Therefore, on the one hand, by limiting the range of the mass percentage of dysprosium and/or terbium in the permanent magnet 1044 to 0 to 0.5%, it is beneficial to reducing the use of dysprosium and/or terbium while ensuring a good anti-demagnetization ability of the motor 100, which is therefore beneficial to reducing the manufacturing cost of the motor 100 and improving the cost performance of the motor 100. On the other hand, by limiting the range of the mass percentage of heavy rare earth elements in the permanent magnet 1044 to 0 to 0.5%, it is beneficial to reducing the use of heavy rare earth elements while ensuring a good anti-demagnetization ability of the motor 100, which is therefore beneficial to reducing the manufacturing cost of the motor 100 and improving the cost performance of the motor 100.

For example, the mass percentage of dysprosium and/or terbium in the permanent magnet 1044 is 0. In one aspect, the mass percentage of dysprosium in the permanent magnet 1044 is 0, i.e., the permanent magnet 1044 does not contain the heavy rare earth element dysprosium, which reduces the consumption of the heavy rare earth element dysprosium by the permanent magnet 1044 and is conducive to energy conservation. In another aspect, the mass percentage of terbium in the permanent magnet 1044 is 0, i.e., the permanent magnet 1044 does not contain the heavy rare earth element terbium, which reduces the consumption of the heavy rare earth element terbium by the permanent magnet 1044 and is conducive to energy conservation. In a further aspect, the sum of the mass percentages of dysprosium and terbium in the permanent magnet 1044 is 0, i.e., the permanent magnet 1044 does not contain the heavy rare earth elements dysprosium and terbium, which reduces the consumption of the heavy rare earth elements dysprosium and terbium by the permanent magnet 1044, is conducive to the sustainable exploitation of resources and energy conservation, and is conducive to reducing the manufacturing cost of the motor 100 and suitable for promotion and application.

It can be understood that the mass percentage of dysprosium and/or terbium in the permanent magnet 1044 may also be other values, for example, the mass percentage of dysprosium and/or terbium in the permanent magnet 1044 is 0.005%, 0.01%, 0.025%, etc.

For example, the mass percentage of heavy rare earth elements in the permanent magnet 1044 is 0, i.e., the permanent magnet 1044 does not contain heavy rare earth elements, which reduces the consumption of strategic resources, is conducive to the sustainable development of resources, reduces the manufacturing cost of the motor 100 and is suitable for promotion and application. It can be understood that the mass percentage of heavy rare earth elements in the permanent magnet 1044 may also be other values, for example, the mass percentage of heavy rare earth elements in the permanent magnet 1044 is 0.005%, 0.01%, 0.025%, etc. The heavy rare earth elements may also include other elements that can be components of the permanent magnet 1044.

Further, the permanent magnet 1044 is a neodymium iron boron permanent magnet, and the neodymium iron boron permanent magnet has excellent magnetic properties and can meet the requirements for use in the motor 100. It can be understood that the permanent magnet 1044 may also be other permanent magnets 1044 that meet the requirements.

As shown in FIGS. 1-3, according to another exemplary embodiment, the motor 100 further comprises: a plurality of punching sheets (not shown in the figures). The stator core 1022 can be formed by stacking the punching sheets; alternatively or additionally, the rotor core 1042 can be formed by stacking the punching sheets (not shown in the figures).

For example, the motor 100 further comprises punching sheets. In one aspect, the stator core 1022 is formed by stacking the punching sheets; in another aspect, the rotor core 1042 is formed by stacking the punching sheets. In a further aspect, the stator core 1022 and the rotor core 1042 are both formed by stacking the punching sheets. The different formation manner of the stator core 1022 or the rotor core 1042 can meet the requirement of different processing processes of the stator assembly 102 and the rotor assembly 104, leading to a wide scope of application.

For example, the stator core 1022 and the rotor core 1042 are both formed by stacking the punching sheets. In one aspect, the punching sheets stacked into the stator core 1022 are the same as the punching sheets stacked into the rotor core 1042, which is conducive to the mass production of the punching sheets and the reduction in the manufacturing cost. In another aspect, the punching sheets stacked into the stator core 1022 are different from the punching sheets stacked into the rotor core 1042, which is conducive to selection of proper punching sheets according to the performance requirement of the motor so as to form the rotor core 1042 and the stator core 1022, thus ensuring good performance of the motor 100. Further, the form of stacking the punching sheets achieves the effect of magnetic conductivity of the iron core, can fix the winding 1026, and can effectively dissipate heat from the motor 100, so that the motor 100 runs more stably.

Further, the punching sheet is made of a soft magnetic material; and/or the thickness of the punching sheet is 0.2 mm to 0.35 mm.

For example, in one aspect, the soft magnetic material can achieve a relatively large magnetization strength with a relatively small external magnetic field. Selecting the soft magnetic material as the raw material for the punching sheet enables the punching sheet to have a high magnetic conductivity, and the soft magnetic material can be magnetized easily and demagnetized easily, which is conducive to reducing the loss of the stator core 1022 and/or the rotor core 1042, i.e., reducing the iron loss of the motor 100, and therefore is conducive to improving the performance of the motor 100. In one aspect, the thickness of the punching sheet is limited to be within a range of 0.2 mm to 0.35 mm. The reasonable setting of the thickness of the punching sheet is conducive to effectively reducing iron loss and improving magnetic conductivity, while ensuring good mechanical strength of the stator core 1022 and/or the rotor core 1042, and the reasonable range setting can also meet the working requirements of the motors 100 of different power.

Further, the rotor core 1042 is provided with a mounting groove 1046, and the permanent magnet 1044 is arranged in the mounting groove 1046. The mounting groove 1046 is a V-shaped groove, a U-shaped groove, a W-shaped groove, a flat groove or an I-shaped groove.

For example, the mounting groove 1046 is arranged to have a variety of different structures, such as a V-shaped groove, a U-shaped groove, a W-shaped groove, a flat groove or an I-shaped groove, which can correspondingly realize the mounting of the permanent magnets 1044 of different structures therein, making the manufacturing process of the motor 100 more flexible, with more options, and can meet a variety of different application scenarios and expand the scope of use of the product.

An embodiment according to the second aspect of the present application provides a compressor, comprising: a casing, and the motor 100 in any one of the above embodiments, the motor 100 being arranged within the casing.

In this embodiment, the compressor comprises the motor 100 in any of the above embodiments, and therefore has all the beneficial effects of the motor 100, which will not be repeated here.

For example, by using a permanent magnet 1044 that does not contain dysprosium and terbium, or a permanent magnet 1044 in which the mass percentage of other heavy rare earth elements such as dysprosium and terbium is significantly reduced in the motor 100, the consumption of heavy rare earth elements, which are national strategic resources, is reduced and the manufacturing cost of the motor 100 is significantly reduced. And by setting the length h of the permanent magnet 1044 in its own magnetization direction, the number Q of the stator slots 1024, and the distance δ between the stator core 1022 and the rotor core 1042, the strength of the demagnetization reverse magnetic field generated by energizing the motor is reduced, while the utilization rate of the permanent magnet 1044 of the motor 100 is improved, so that the anti-demagnetization ability of the motor 100 can meet the requirement of demagnetization resistance for the operation of the compressor.

An embodiment according to the third aspect of the present application provides a refrigeration device, comprising: the motor 100 in any of the above embodiments, or the compressor in any of the above embodiments.

In this embodiment, the refrigeration device comprises the motor 100 in any of the above embodiments or the compressor in any of the above embodiments, and therefore has all the beneficial effects of the motor 100 or the compressor, which will not be repeated here.

Further, the refrigeration device also comprises a pipeline communicating with the compressor, and a refrigerant passes through the circulation loop formed by the pipeline and the compressor to achieve heat exchange and refrigeration. For example, the refrigeration device is an air conditioner, and the air conditioner is a household variable-frequency air conditioner.

Exemplary Example

As shown in FIG. 1 and FIG. 2, the motor 100 provided according to an embodiment of the present application comprises a stator assembly 102 and a rotor assembly 104. An air gap is provided between the rotor assembly 104 and the stator assembly 102, as shown in FIG. 3, the width of the air gap is the distance δ between the stator core and the rotor core in a section perpendicular to the axis of the rotor core. The rotor assembly 104 is disposed opposite the stator assembly 102 and is rotatable relative to the stator assembly 102. The rotor assembly 104 is disposed coaxially within the stator assembly 102.

The stator assembly 102 comprises a stator core 1022 and a winding 1026. The stator core 1022 is provided with a stator slot 1024, and the winding 1026 is arranged in the stator slot 1024.

The rotor assembly 104 comprises a rotor core 1042 and a permanent magnet, the rotor core 1042 is provided with a mounting groove 1046, and the permanent magnet 1044 is arranged in the mounting groove 1046. The permanent magnet is a neodymium iron boron magnet. For example, the neodymium iron boron magnet does not contain heavy rare earth elements dysprosium and terbium, and the intrinsic coercivity of the permanent magnet at 20° C. is Hcj, Hcj≤1800 kA/m.

It is limited that the number of the stator slots 1024 is Q, the width of the air gap is δ mm, and the thickness of the permanent magnet 1044 in the section perpendicular to the axis of the rotor core 1042 is h mm, i.e., the length of the permanent magnet 1044 in the magnetization direction is h mm. It is found through studies that when the value of h satisfies $80\times(43-Q)/Hcj \leq h \leq 1.6+\delta$, the utilization rate of the permanent magnet 1044 of the motor 100 is relatively high, the cost of the motor 100 is low, and the anti-demagnetization ability meets the requirement of demagnetization resistance for the operation of the compressor, which improves the cost performance of the motor.

For example, in the B-H curve of the permanent magnet shown in FIG. 4, when the permanent magnet 1044 does not have an externally applied magnetic field, the working point of the permanent magnet 1044 is at the position of point P. When a reverse magnetic field is applied, the working point moves down along the B-H curve to the position of point W; and when the reverse magnetic field is removed, the working point returns along the return line of point W. When point W is located above the inflection point D of the B-H curve, the return line coincides with the B-H curve (the Br1-D solid line shown in FIG. 4). When point W exceeds the inflection point D, the return line of point W is parallel to the straight line segment of the B-H curve, and the return line at this time is the Br2-W dotted line shown in FIG. 4, producing irreversible demagnetization.

As can be seen, there are three factors that affect the anti-demagnetization ability of the motor 100, i.e., the position of the working point of the permanent magnet 1044, the magnitude of the absolute value of the intrinsic coercivity Hcj of the permanent magnet 1044, and the strength of the reverse magnetic field. Hcj determines the magnitude of the value of the inflection point D. The larger the absolute value of Hcj is, the larger the Hd value of the inflection point D is and the stronger the anti-demagnetization ability is. The smaller the absolute value of Hcj is, the smaller the Hd value of the inflection point D is and the weaker the anti-demagnetization ability is. The higher the position of the working point of the permanent magnet 1044 is, the stronger the anti-demagnetization ability is. The strength of the reverse magnetic field determines the distance by which the working point P moves down to W. When the working point position P remains unchanged, the reverse magnetic field is relatively strong, and the lower point W is, the weaker the anti-demagnetization ability is.

Further, the components of the permanent magnet 1044 in the present application do not contain heavy rare earth elements such as dysprosium and terbium, i.e., the mass percentage of heavy rare earth elements, or dysprosium and terbium in the permanent magnet is 0. At 20° C., the intrinsic coercivity (Hcj≤1800 kA/m) of the permanent magnet is significantly smaller than the coercivity (Hcj≥1830 kA/m) of the permanent magnet containing dysprosium and terbium. The B-H curves of different permanent magnets are shown in FIG. 5. In the field of compressors, if the permanent magnets 1044 free of dysprosium and terbium are directly applied to the prior art (e.g., a slot-pole match of 9 slots and 6 poles), the demagnetization ability of the motors 100 decreases by 40% or more, and the demagnetization ability of the motors cannot meet the requirement.

For the cost of the motor, improving the utilization rate of the permanent magnet 1044 can reduce the usage of the permanent magnet 1044 and thereby reduce the cost of the motor 100. The utilization rate of the permanent magnet 1044 can reach its maximum when the working point of the permanent magnet 1044 is at a position with the maximum magnetic energy product of the permanent magnet 1044. In other words, the closer the working point of the permanent magnet 1044 is to the position with the maximum magnetic energy product, the higher the utilization rate of the permanent magnet 1044 is. The position with the maximum magnetic energy product of the permanent magnet 1044 is generally the midpoint of the straight section of the demagnetization curve of the permanent magnet 1044. Studies show that, the larger the length of the permanent magnet 1044 in the magnetization direction (i.e., the length h of the permanent magnet in its own magnetization direction) is, the higher the working point of the permanent magnet 1044 is, and in the upper half of the B-H curve, the higher the working point is and the further the working point is from the point with the maximum magnetic energy product, the lower the utilization rate of the permanent magnet 1044 is. In another aspect, the air gap width δ between the stator core 1022 and the rotor core 1042 of the motor also affects the usage of the permanent magnet 1044. The smaller the air gap width δ is, the lower the usage of the permanent magnet 1044 is. When the width of the permanent magnet 1044 is certain, the length h of the permanent magnet 1044 in its own magnetization direction is smaller.

In other words, the larger the h of the permanent magnet is, the higher the working point of the permanent magnet 1044 is, but the lower the utilization rate of the permanent magnet 1044 is; conversely, the smaller the h of the magnet is, the lower the working point of the permanent magnet 1044 is, the higher the utilization rate of the permanent magnet 1044 is, but the lower the working point of the permanent magnet 1044 is, the poorer the anti-demagnetization ability is.

For the above reasons, this embodiment enhances the anti-demagnetization ability of the motor by reducing the strength of the reverse magnetic field generated by energizing the winding of the motor 100 to demagnetize the permanent magnet. Reducing the strength of the reverse magnetic field is mainly to reduce the number of the turns of the winding 1026 in each stator slot 1024. It is known from electro mechanics that the number of the series turns of the winding per phase is equal to the number of the turns per slot/2 (double-layer winding) multiplied by the number Q of the stator slots and then divided by the number m of the phases. As can be seen, increasing the number Q of the stator slots 1024 can reduce the number of the turns per slot of the winding 1026, and when the number of the turns per slot is reduced, the strength of the reverse magnetic field is reduced, and the anti-demagnetization ability of the motor is enhanced. Then when the length h of the permanent magnet in its own magnetization direction satisfies $80\times(43-Q)/Hcj \leq h \leq 1.6+\delta$, the motor 100 has the highest utilization rate of the permanent magnet 1044, the cost of the motor 100 is low, and the anti-demagnetization ability is high.

Further, h, Q, δ and Hcj can be designed according to the following relation: $80\times(45-Q)/Hcj \leq h \leq 1.3+\delta$.

Further, the number Q of the stator slots 1024 is ≥12, and the air gap width δ≤0.5 mm.

Further, the remanence Br of the permanent magnet 1044 is ≥1.28 T.

Further, the mounting groove 1046 of the magnet 1044 may have various forms in shape and distribution position. The mounting groove 1046 of the permanent magnet 1044 is a V-shaped groove, a U-shaped groove, a W-shaped groove, a flat groove or an I-shaped groove.

Further, the stator core 1022 and the rotor core 1042 are made of soft magnetic material sheets, the soft magnetic material sheet is a silicon steel sheet, and the thickness of the soft magnetic material sheet is 0.2 mm-0.35 mm.

In description of the present application, the term "a plurality of" means two or more, unless otherwise explicitly defined. The orientation or position relationships indicated by the terms "upper", "lower" and the like are the orientation or position relationships based on what is shown in the drawings, are merely for the convenience of describing the present application and simplifying the description, and do not indicate or imply that the device or unit referred to must have a particular orientation and is constructed and operated in a specific orientation, and thus cannot be understood as the limitation of the present application. The terms "connection", "mounting", "fixing" and the like should all be understood in a broad sense, for example, "connection" may be a fixed connection, and may also be a removable connection, or an integral connection; may refer to direct connection and may also refer to indirect connection through an intermediary. A person of ordinary skills in the art could understand the specific meaning of the terms in the present application according to specific situations.

In the description of the present application, the descriptions of the terms "one embodiment", "some embodiments" and "specific embodiments" and the like mean that specific features, structures, materials or characteristics described in conjunction with the embodiment(s) or example(s) are included in at least one embodiment or example of the present application. In the present application, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present application, which are not used to limit the present application. For a person skilled in the art, the present application may have various changes and variations. Any modifications, equivalent substitutions, improvements etc. within the spirit and principle of the present application shall all be included in the protection scope of the present application.

What is claimed is:

1. A motor comprising:
a stator assembly comprising a stator core provided with stator slots; and
a rotor assembly comprising a rotor core and a permanent magnet, the stator core is provided around an outer circumference of the rotor core or vice versa, and the permanent magnet being arranged on the rotor core,
wherein in a section perpendicular to an axis of the rotor core, a distance between the stator core and the rotor core is $\delta$ mm, a length of the permanent magnet in a magnetization direction of the permanent magnet is h mm, a number of the stator slots is Q, and an intrinsic coercivity of the permanent magnet is Hcj kA/m,
wherein the values of Hcj, Q, $\delta$, and h satisfy: $Hcj \leq 1800$ kA/m, $12 \leq Q \leq 36$, $\delta = 0.3$, and $80 \times (45-Q)/Hcj < h \leq 1.3 + \delta$, and
wherein a remanence Br of the permanent magnet ranges from 1.28 T to 1.36 T.

2. The motor according to claim 1, wherein a mass percentage of heavy rare earth elements in the permanent magnet ranges from 0 to 0.5%.

3. The motor according to claim 1, wherein a mass percentage of dysprosium and/or terbium in the permanent magnet ranges from 0 to 0.5%.

4. The motor according to claim 1, further comprising:
a plurality of punching sheets,
wherein at least one of the stator core and the rotor core is formed by stacking the plurality of punching sheets.

5. The motor according to claim 4, wherein each punching sheet is made of a soft magnetic material.

6. The motor according to claim 4, wherein a thickness of each punching sheet is in a range of 0.2 mm to 0.35 mm.

7. The motor according to claim 1, wherein:
the rotor core is provided with a mounting groove, and the permanent magnet is arranged in the mounting groove, and
the mounting groove comprises a V-shaped groove, a U-shaped groove, a W-shaped groove, a flat groove or an I-shaped groove.

8. A compressor comprising:
a casing, and
the motor according to claim 1, the motor being arranged within the casing.

9. A refrigeration device comprising the compressor according to claim 8.

* * * * *